United States Patent
Sanz et al.

(10) Patent No.: US 10,370,481 B2
(45) Date of Patent: Aug. 6, 2019

(54) NON-HOT-MELT 2,4-TDI-BASED POLYURETHANE COMPOSITION BEARING NCO END GROUPS AND HAVING A LOW CONTENT OF TDI MONOMER, COMPRISING AT LEAST ONE ISOCYANATE COMPOUND OF PARTICULAR MOLAR VOLUME

(71) Applicant: BOSTIK SA, La Plaine St Denis (FR)

(72) Inventors: Federico Sanz, Choisy au Bac (FR); Guillaume Michaud, Compiegne (FR)

(73) Assignee: BOSTIK SA, La Plaine St Denis (FR)

( * ) Notice: Subject to any disclaimer, the term of this patent is extended or adjusted under 35 U.S.C. 154(b) by 0 days.

(21) Appl. No.: 14/722,731

(22) Filed: May 27, 2015

(65) Prior Publication Data

US 2015/0344612 A1 Dec. 3, 2015

(30) Foreign Application Priority Data

May 28, 2014 (FR) .................... 14 54823

(51) Int. Cl.
| | |
|---|---|
| *C08G 18/76* | (2006.01) |
| *C08G 18/48* | (2006.01) |
| *C08G 18/10* | (2006.01) |
| *C08G 18/30* | (2006.01) |
| *C09J 175/08* | (2006.01) |

(52) U.S. Cl.
CPC ......... *C08G 18/7642* (2013.01); *C08G 18/10* (2013.01); *C08G 18/307* (2013.01); *C08G 18/4829* (2013.01); *C08G 18/4845* (2013.01); *C08G 18/7614* (2013.01); *C08G 18/7621* (2013.01); *C09J 175/08* (2013.01); *C08G 2170/40* (2013.01)

(58) Field of Classification Search
CPC .. C08G 18/10; C08G 18/307; C08G 18/7671; C08G 18/83; C08G 18/82; C08G 18/7607; C08G 18/724
USPC ........................................... 525/457
See application file for complete search history.

(56) References Cited

U.S. PATENT DOCUMENTS

| | | |
|---|---|---|
| 4,882,408 A | 11/1989 | Blum |
| 6,515,164 B1 | 2/2003 | Bolte et al. |

(Continued)

FOREIGN PATENT DOCUMENTS

| | | |
|---|---|---|
| DE | 102008025793 A1 | 12/2009 |
| EP | 0300388 A2 | 1/1989 |

(Continued)

OTHER PUBLICATIONS

Search Report from French Priority Application FR 14/54823 dated Jan. 22, 2015.

*Primary Examiner* — Michael M Dollinger
(74) *Attorney, Agent, or Firm* — Millen, White, Zelano and Branigan, P.C.

(57) ABSTRACT

1) Polyurethane composition comprising:
a) at least 98% by weight of at least one non-hot-melt polyurethane bearing NCO end groups based on 2,4-toluene diisocyanate,
b) a TDI monomer content of less than 0.1% by weight,
c) at least one particular isocyanate compound with a molar volume of less than or equal to 300 milliliters per mole.

2) Process for preparing a polyurethane composition as defined previously, and an adhesive composition formulated from such a polyurethane composition.

11 Claims, 1 Drawing Sheet

(56) References Cited

U.S. PATENT DOCUMENTS

| | | | |
|---|---|---|---|
| 7,601,239 B1 * | 10/2009 | Cercone | C04B 37/008 |
| | | | 156/325 |
| 9,290,606 B2 * | 3/2016 | Ulkem | C08G 18/10 |
| 9,637,667 B2 * | 5/2017 | Krebs | C08G 18/10 |
| 2006/0020101 A1 * | 1/2006 | Wintermantel | C08G 18/10 |
| | | | 528/44 |
| 2007/0129525 A1 | 6/2007 | Eichelmann et al. | |
| 2012/0225225 A1 * | 9/2012 | Franken | C08G 18/10 |
| | | | 428/34.1 |
| 2013/0059973 A1 * | 3/2013 | Wamprecht | C08G 18/10 |
| | | | 524/590 |

FOREIGN PATENT DOCUMENTS

| | | | |
|---|---|---|---|
| WO | 2005097861 A1 | 10/2005 | |
| WO | 2011051019 A1 | 5/2011 | |

* cited by examiner

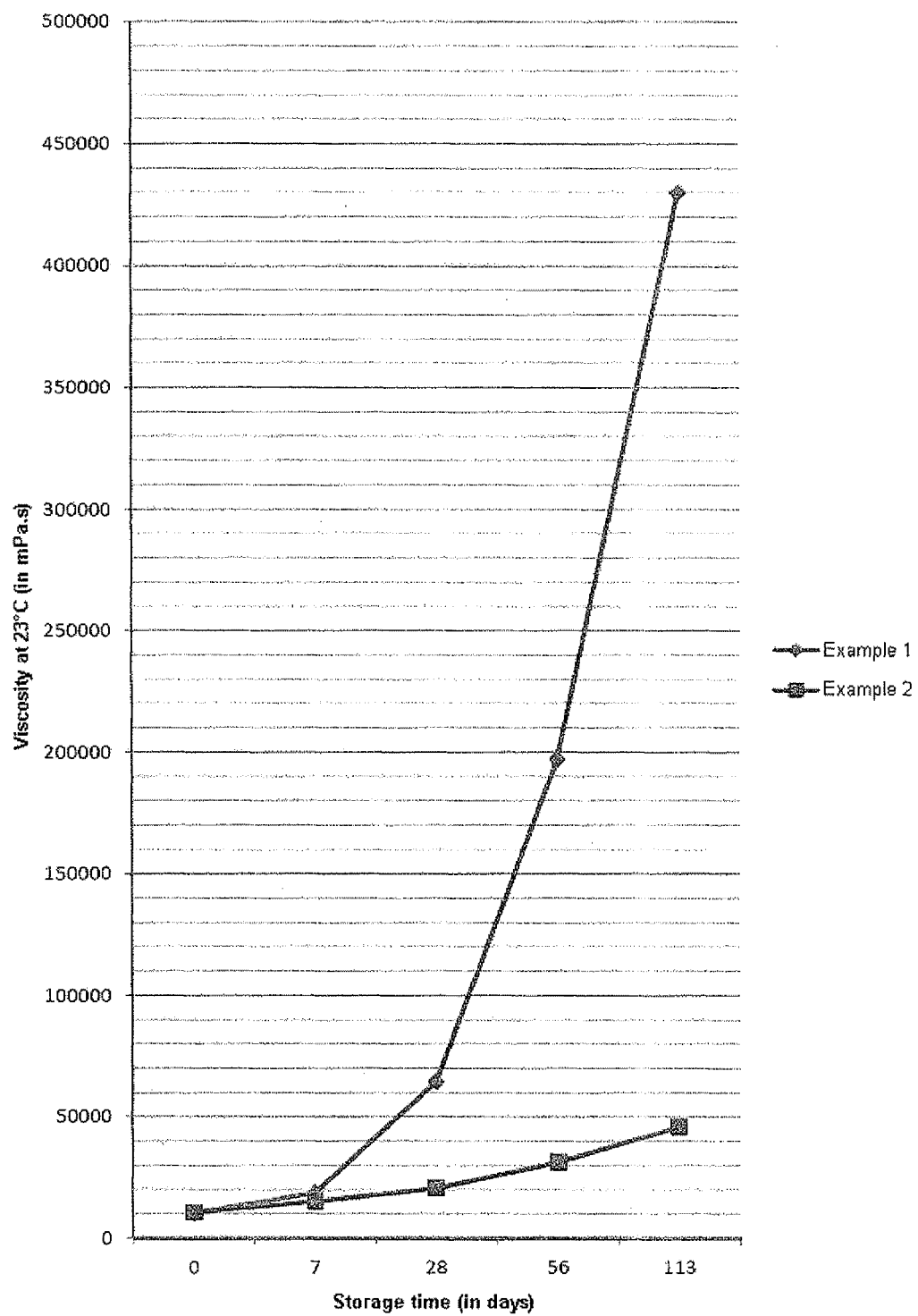

NON-HOT-MELT 2,4-TDI-BASED POLYURETHANE COMPOSITION BEARING NCO END GROUPS AND HAVING A LOW CONTENT OF TDI MONOMER, COMPRISING AT LEAST ONE ISOCYANATE COMPOUND OF PARTICULAR MOLAR VOLUME

The present invention relates to a composition based on non-hot-melt 2,4-toluene diisocyanate (2,4-TDI)-based polyurethane bearing NCO end groups, and having a low content of TDI monomer derived from the synthesis of said polyurethane, comprising at least one isocyanate compound of particular molar volume as described subsequently (noted compound (A)).

By virtue of the presence of said compound (A), the polyurethane composition according to the invention has improved stability in terms of viscosity, reflected by a reduced increase in viscosity over time.

The present invention also relates to the use of such a polyurethane composition as an adhesive composition that is stable over time in terms of viscosity.

The present invention also relates to the use of such a polyurethane composition for manufacturing an adhesive composition, which is stable over time in terms of viscosity.

The present invention also relates to a process for preparing such compositions according to the invention that are stable over time in terms of viscosity, characterized in that compound (A) (or all of the compounds (A)) is added in post-synthesis of the non-hot-melt polyurethane(s) containing NCO end groups based on 2,4-toluene diisocyanate (2,4-TDI) into a composition with a low content of TDI monomer comprising said polyurethane(s).

To satisfy the need of the greatest number, it is sought to develop adhesive compositions that may be used or applied at low temperature (between 5 and 35° C.) and especially at low temperature (23° C.).

Many adhesive compositions that are available on the market are manufactured from TDI-based reactive polyurethanes, especially bearing isocyanate end groups which crosslink in the presence of moisture.

However, these composition generally have the drawback of comprising large contents of TDI originating from the polyurethane synthesis reaction, which are liable to lead to a certain number of drawbacks, among which are toxicity problems.

The preparation of TDI-based polyurethanes bearing NCO end groups is conventionally performed by reaction of a polyol with a stoichiometric excess of TDI. This stoichiometric excess may be reflected by an NCO/OH mole ratio strictly greater than 1, which corresponds to the mole ratio of the number of isocyanate (NCO) groups to the number of hydroxyl (OH) groups borne by the reactive species bearing such functions, used in the preparation of the polyurethane. Said stoichiometric excess is necessary for obtaining isocyanate end groups on the polyurethane. Depending on the chosen NCO/OH mole ratio, the polyurethane synthesised is obtained with a more or less large excess of residual TDI monomer, corresponding to the TDI monomer that is unreacted at the end of reaction.

In order to reduce the drawbacks associated with the presence of a high content of TDI, studies have been conducted to synthesise TDI-based polyurethanes bearing NCO end groups with a minimum amount of residual TDI monomer.

However, it has been observed that polyurethane compositions having a TDI monomer content of less than 0.1% by weight relative to the weight of the polyurethane composition are highly viscous at room temperature and have problems of stability over time in terms of viscosity.

Specifically, these polyurethane compositions with a low content of TDI monomer have a limited storage life and their viscosity rapidly increases over time, until they become too viscous to be able to be formulated in the form of an adhesive composition, which may be used or applied at low temperature (5-35° C.) and especially at room temperature (23° C.).

It is known practice to use diluents such as hydrocarbon-based organic solvents or plasticizers to reduce the viscosity of polyurethane compositions bearing NCO end groups with a low content of residual diisocyanate monomer. However, these diluents have the drawback of needing to be used in large amounts which is generally undesired. In addition, these diluents do not efficiently stabilise the evolution of viscosity of such polyurethane compositions, especially in the long term.

Alternatively, patent application WO 2011/05 1019 has proposed to add a $C_2$-$C_{24}$ monocarboxylic or dicarboxylic acid ester to reduce the viscosity of a polyurethane composition bearing NCO end groups with a low content of residual diisocyanate monomer. In the examples, it was demonstrated that by adding 5% to 6% by weight of a particular ester to a 2,4-TDI-based polyurethane composition bearing NCO end groups with a low content of residual TDI monomer, the viscosity of the composition changed very little or not at all over time after one week at 40° C.

However, the efficacy of this stabilization remains to be improved, especially in the light of the amounts of stabiliser used and/or of the stabilization time.

Thus, there is a need to provide a 2,4-TDI-based polyurethane composition bearing NCO end groups, which has a TDI content of less than 0.1% by weight relative to the weight of the polyurethane composition, which does not have all or some of the drawbacks of the prior art.

In particular, there is a need to provide a 2,4-TDI-based polyurethane composition bearing NCO end groups which has a TDI content of less than 0.1% by weight relative to the weight of the polyurethane composition, which may be stabilized more efficiently in terms of viscosity, especially using a lower total content of stabilizer when compared with the prior art.

There is also a need to provide a 2,4-TDI-based polyurethane composition bearing NCO end groups which has a TDI content of less than 0.1% by weight relative to the weight of said composition, which may be used at low temperature (5-35° C.) and especially at room temperature (23° C.), and which is sufficiently stable over time in terms of viscosity over long periods of storage. In particular, it is estimated that such a composition is stable over time in terms of viscosity when its viscosity, measured at 23° C., after 90 days of storage of the composition at 23° C. under anhydrous conditions, does not exceed five times the value of the viscosity measured under the same conditions just after the end of the reaction for the synthesis of said polyurethane with a low TDI content.

There is also a need to control the change in viscosity of a 2,4-TDI-based polyurethane composition bearing NCO end groups which has a TDI content of less than 0.1% by weight relative to the weight of said composition, without degrading one or more of its intrinsic properties (especially elasticity and modulus).

Moreover, there is a need to formulate an adhesive composition comprising at least one 2,4-TDI-based polyurethane bearing NCO end groups and less than 0.1% by weight of TDI relative to the weight of said composition, having one or more of the abovementioned advantages.

Surprisingly, it has been found that the addition of at least one isocyanate compound with a molar volume of less than or equal to 300 mL/mol (compound (A)) to a composition comprising at least one 2,4-TDI-based non-hot-melt polyurethane bearing NCO end groups and a TDI content of less than 0.1% by weight relative to the weight of said composition, makes it possible to satisfy all or some of these needs.

In particular, it has been found that the addition of at least one compound (A) makes it possible to efficiently and satisfactorily reduce the increase in viscosity over time of a polyurethane composition comprising at least one 2,4-TDI-based non-hot-melt polyurethane bearing NCO end groups and a TDI content of less than 0.1% by weight relative to the weight of said composition, thus making it possible to obtain compositions that are stable enough to be able to be readily used at low temperature (5-35° C.) and especially at room temperature (23° C.), even after long periods of storage (up to 3-4 weeks at 23° C. under anhydrous conditions).

Moreover, it has been found that the addition of at least one compound (A) to an adhesive composition formulated using a polyurethane composition comprising at least one 2,4-TDI-based non-hot-melt polyurethane bearing NCO end groups and a TDI content of less than 0.1% by weight relative to the weight of the polyurethane composition, in any of its preparation steps, subsequent to the addition of said polyurethane composition to the adhesive composition, makes it possible to obtain the same advantages as mentioned above.

In addition, it has been observed that the use of a small amount of compound(s) (A) sufficed to obtain stabilization of the viscosity of a polyurethane composition comprising at least one 2,4-TDI-based non-hot-melt polyurethane bearing NCO end groups and a TDI content of less than 0.1% by weight relative to the weight of the polyurethane composition, making it possible to formulate a one-pack or two-pack adhesive composition, which is stable over time in terms of viscosity and which has satisfactory mechanical, adhesive and/or applicative properties. In particular, said properties do not undergo any substantial degradation consecutive to the addition of compound(s) (A).

The present patent application thus relates to the use of at least one compound (A) comprising at least one isocyanate group and having a molar volume of less than or equal to 300 milliliters per mole (mL/mol) as viscosity stabilizer of a polyurethane composition comprising at least one 2,4-TDI-based non-hot-melt polyurethane bearing NCO end groups and a TDI content of less than 0.1% by weight relative to the weight of the polyurethane composition. Such a stabilizer is capable by itself, without the need for viscosity stabilizers of the prior art in the amounts prescribed by the prior art, of reducing the increase in viscosity over time of a polyurethane composition comprising at least one 2,4-TDI-based non-hot-melt polyurethane bearing NCO end groups and a TDI content of less than 0.1% by weight relative to the weight of the polyurethane composition.

The present patent application also relates to the use of at least one compound (A) as viscosity stabilizer for an adhesive composition formulated using a polyurethane composition comprising at least one 2,4-TDI-based non-hot-melt polyurethane bearing NCO end groups and a TDI content of less than 0.1% by weight relative to the weight of the polyurethane composition.

Other subjects and characteristics of the present invention will emerge more clearly on reading the description and the examples.

In the present patent application, in the absence of indications to the contrary:
the viscosity is measured at room temperature (23° C.). The viscosity measurement at 23° C. may be performed using a Brookfield viscometer according to standard ISO 2555. Typically, the measurement performed at 23° C. may be done using a Brookfield RVT viscometer, with a needle adapted to the viscosity range and at a spin speed of 20 revolutions per minute (rpm);
the weight-average molar masses (Mw), expressed in daltons (Da), are determined by gel permeation chromatography (GPC), the column being calibrated with polyethylene glycol (PEG) standards.

A subject of the present patent application is, firstly, a polyurethane composition comprising:
a) at least 98% by weight of at least one non-hot-melt polyurethane bearing NCO end groups based on 2,4-toluene diisocyanate (2,4-TDI),
b) a content of TDI monomer of less than 0.1% by weight,
c) at least one isocyanate compound with a molar volume of less than or equal to 300 milliliters per mole (mL/mol) (noted compound (A)),
the weight percentages being expressed relative to the total weight of the polyurethane composition.

The 2,4-TDI-based polyurethane(s) bearing NCO end groups according to the invention are non-hot-melt, i.e. they are not solid at a temperature ranging from 5 to 35° C., and especially at room temperature (23° C.). In particular, they have a viscosity measured at 23° C. of less than or equal to 150 000 mPa·s, preferably less than or equal to 100 000 mPa·s, more preferentially ranging from 100 to 50 000 mPa·s and better still ranging from 500 to 50 000 mPa·s (millipascal-seconds). Such polyurethanes are sufficiently fluid at a temperature ranging from 5 to 35° C. to be able to be readily used in this temperature range.

The non-stabilized 2,4-TDI-based polyurethane composition bearing NCO end groups with a low content of TDI, which may be used according to the invention for preparing a stable polyurethane composition according to the invention may be obtained via a polyaddition reaction of a composition consisting of polyisocyanate(s) comprising at least TDI at 95% by weight at least, preferably 98% by weight at least, and better still 99% by weight at least of 2,4-TDI relative to the weight of TDI, and of a composition consisting of polyol(s), at a temperature of less than 95° C., preferably ranging from 65 to 85° C., more preferentially ranging from 70 to 80° C., under anhydrous conditions, with or without a reaction catalyst, in amounts of polyisocyanate(s) and of polyol(s) leading to an NCO/OH ratio noted r1 ranging from 1.60 to 1.90, preferably ranging from 1.65 to 1.85 and better still ranging from 1.65 to 1.80. This preparation process makes it possible to synthesize a 2,4-TDI-based polyurethane bearing NCO end groups with little residual TDI monomer. The TDI content at the end of reaction is generally less than 0.1% by weight relative to the weight of the reaction medium.

The weight amounts of reagents to be loaded into the reactor to synthesize the 2,4-TDI-based polyurethane composition bearing NCO end groups with a low content of TDI used according to the invention are determined on the basis of the ratio r1, and also, as regards polyols, on the basis of their number-average molar mass and their functionality, or as regards polyisocyanates, on the basis of their content of isocyanate groups (% NCO expressed as a weight percentage relative to the weight of polyisocyanate).

The abovementioned polyisocyanate composition may consist of TDI alone, at 95% by weight at least, preferably 98% by weight at least, and better still 99% by weight at least of 2,4-TDI relative to the weight of TDI, or mixed with one or more polyisocyanate monomers other than TDI. These polyisocyanate monomers may be chosen from those usually used in the synthesis of a polyurethane bearing NCO end groups, preferably from diisocyanate monomers other than TDI, and more preferentially from diphenylmethane diisocyanate (MDI), isophorone diisocyanate (IPDI) and hexamethylene diisocyanate (HDI).

Preferably, the polyisocyanate composition consists of one or more TDI isomers, and of at least 95% by weight, in particular of at least 98% by weight, more particularly of at least 99% by weight and better still of at least 99.5% by weight of 2,4-TDI relative to the weight of the polyisocyanate composition.

The polyisocyanate compositions that may be used according to the invention are widely commercially available. By way of example, mention may be made of Scuranate® T100 sold by the company Vencorex, corresponding to a 2,4-TDI with a purity of greater than 99% by weight.

The abovementioned polyol composition may consist of a polyol or of a mixture of polyols. In particular, the polyol(s) that may be used may be chosen from those with a number-average molar mass ranging from 200 to 20 000 g/mol and preferably from 400 to 18 000 g/mol.

Preferably, their hydroxyl functionality ranges from 2 to 4. The hydroxyl functionality is the mean number of hydroxyl functions per mole of polyol.

In particular, the polyol(s) that may be used may be chosen from polyester polyols, polyether polyols and polydiene polyols, and mixtures thereof.

The polyol(s) that may be used may be chosen from aromatic polyols, aliphatic polyols and mixtures of these compounds.

The polyester polyol(s) that may be used according to the invention may be chosen from those with a number-average molar mass ranging from 1000 to 10 000 g/mol, preferably from 2000 to 6000 g/mol. Preferably, their hydroxyl functionality ranges from 2 to 4. Examples that may be mentioned include:
  polyester polyols of natural origin such as castor oil;
  polyester polyols resulting from the condensation:
    of one or more aliphatic (linear, branched or cyclic) or aromatic polyols such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine and mixtures of these compounds, with
    one or more polycarboxylic acids or ester or anhydride derivative thereof such as 1,6-hexanedioic acid, dodecanedioic acid, azelaic acid, sebacic acid, adipic acid, 1,18-octadecanedioic acid, phthalic acid, succinic acid and mixtures of these acids, an unsaturated anhydride such as maleic or phthalic anhydride, or a lactone such as caprolactone.

The abovementioned polyester polyols are prepared conventionally, and most are commercially available. Among the polyester polyols that may be used, mention may be made of the following products with a hydroxyl functionality equal to 2:
  Tone® 0240 (available from Union Carbide) which is a polycaprolactone with a number-average molar mass of about 2000 g/mol and a melting point of about 50° C.,
  Dynacoll® 7381 with a number-average molar mass of about 3500 g/mol and a melting point of about 65° C.,
  Dynacoll® 7360 which results from the condensation of adipic acid with hexanediol, and has a number-average molar mass of about 3500 g/mol and a melting point of about 55° C.,
  Dynacoll® 7330 with a number-average molar mass of about 3500 g/mol and a melting point of about 85° C.,
  Dynacoll® 7363 which also results from the condensation of adipic acid with hexanediol and has a number-average molar mass of about 5500 g/mol and a melting point of about 57° C.

The Dynacoll® products mentioned above are sold by the company Evonik.

Preferably, use is made, as polyester polyol, of a polycaprolactone, castor oil or a polyester polyol resulting from the condensation of ethanediol, 1,3-propanediol and/or 1,6-hexanediol with adipic acid and/or phthalic acid.

It is preferred to use a polyester polyol with a melting point of greater than or equal to 55° C., corresponding to pronounced crystallinity.

The polyether polyol(s) that may be used according to the invention may be chosen from those with a number-average molar mass ranging from 200 to 20 000 g/mol and preferably from 400 to 12 000 g/mol.

Preferably, their hydroxyl functionality ranges from 2 to 3.

The polyether polyol(s) that may be used according to the invention are preferably chosen from polyoxyalkylene polyols, in which the linear or branched alkylene part comprises from 1 to 4 carbon atoms, preferably from 2 to 3 carbon atoms.

More preferentially, the polyether polyol(s) that may be used according to the invention are preferably chosen from polyoxyalkylene diols and polyoxyalkylene triols, and better still polyoxyalkylene diols, the linear or branched alkylene part of which comprises from 1 to 4 carbon atoms, preferably from 2 to 3 carbon atoms.

As examples of polyoxyalkylene diols or triols that may be used according to the invention, mention may be made of:
  polyoxypropylene diols or triols (also known as polypropylene glycol (PPG) diols or triols) with a number-average molar mass ranging from 400 to 18 000 g/mol and preferably ranging from 400 to 4000 g/mol,
  polyoxyethylene diols or triols (also known as polyethylene glycol (PEG) diols or triols) with a number-average molar mass ranging from 400 to 18 000 g/mol and preferably ranging from 400 to 4000 g/mol,
  PPG/PEG diol or triol copolymers with a number-average molar mass ranging from 400 to 18 000 g/mol and preferably ranging from 400 to 4000 g/mol,
  polytetrahydrofuran (polyTHF) diols or triols with a number-average molar mass ranging from 250 to 4000 g/mol,
  polytetramethylene glycols (PTMG) with a number-average molar mass ranging from 200 to 4000 g/mol,
  polybutylene glycols (PBG) with a number-average molar mass ranging from 200 to 4000 g/mol,
  and mixtures thereof.

Preferably, the polyether polyol(s) that may be used are chosen from polyoxypropylene diols or triols. The abovementioned polyether polyols are prepared conventionally, and are widely commercially available. They may be obtained by polymerization of the corresponding alkylene oxide in the presence of a catalyst based on a metal-cyanide double complex.

Examples of polyether diols that may be mentioned include the polyoxypropylene diols sold under the name Acclaim® by the company Bayer, such as Acclaim® 12200 with a number-average molar mass in the region of 11335 g/mol, Acclaim® 8200 with a number-average molar mass of 8057 g/mol, and Acclaim® 4200 with a number-average molar mass in the region of 4020 g/mol, or alternatively the polyoxypropylene diol sold under the name Voranol P2000 by the company Dow with a number-average molar mass in the region of 2004 g/mol.

Examples of polyether triols that may be mentioned include the polyoxypropylene triol sold under the name Voranol CP3355 by the company Dow, with a number-average molar mass in the region of 3554 g/mol.

The polydiene polyol(s) that may be used according to the invention are preferably chosen from polydienes comprising hydroxyl end groups, and the corresponding hydrogenated or epoxidized derivatives thereof.

More preferentially, the polydiene polyol(s) that may be used according to the invention are chosen from polybutadienes comprising hydroxyl end groups, which are optionally hydrogenated or epoxidized.

Better still, the polydiene polyol(s) that may be used according to the invention are chosen from butadiene homopolymers comprising hydroxyl end groups, which are optionally hydrogenated or epoxidized.

The term "hydroxyl end groups" means that the hydroxyl groups are located at the ends of the main chain of the polydiene polyol.

The abovementioned hydrogenated derivatives may be obtained by total or partial hydrogenation of the double bonds of a polydiene comprising hydroxyl end groups, and are thus saturated or unsaturated.

The abovementioned epoxidized derivatives may be obtained by chemoselective epoxidation of the double bonds of the main chain of a polydiene comprising hydroxyl end groups, and thus comprise at least one epoxy group in its main chain.

Examples of polybutadiene polyols that may be mentioned include saturated or unsaturated butadiene homopolymers, comprising hydroxyl end groups, which are optionally epoxidized, as sold under the name PolyBD® or Krasol® by the company Cray Valley.

Preferably, the polyol composition consists of one or more polyols chosen from those mentioned previously and mixtures thereof. In particular, the polyol composition may consist of one or more polyols including at least one polyether polyol. More particularly, the polyol composition may consist of one or more polyether polyols.

The polyisocyanate composition and the polyol composition used in the process for preparing the 2,4-TDI-based polyurethane bearing NCO end groups used according to the invention are preferably chosen so as to obtain a non-hot-melt 2,4-TDI-based polyurethane bearing NCO end groups, especially having a viscosity as described above.

The reaction catalyst(s) that may be used may be any catalyst known to those skilled in the art for catalysing the formation of polyurethane by reaction of at least one polyisocyanate and of at least one polyol.

An amount ranging up to 1% by weight of catalyst(s) relative to the weight of the polyurethane composition according to the invention may be used. In particular, it is preferred to use from 0.02% to 0.5% by weight of catalyst(s) relative to the weight of the polyurethane composition according to the invention.

The content of 2,4-TDI-based polyurethane bearing NCO end groups is preferably at least 99% by weight relative to the total weight of the polyurethane composition according to the invention.

The content of TDI monomer in the polyurethane composition according to the invention is less than 0.1% by weight relative to the total weight of the polyurethane composition according to the invention.

The principle of the analytical method for determining the concentration of residual diisocyanate (TDI) monomers is based on the specific reaction of the isocyanate group NCO with an amine (1-(2-methoxyphenyl)piperazine or PPZ) to form stable urea derivatives. These derivatives are obtained during the preparation of the sample to be analysed by dilution/dissolution of this sample using an acetonitrile solution containing 0.02 mol/L of PPZ. The PPZ derivatives formed from the isocyanates contained in the sample to be analysed are then assayed with a C18 reverse-phase high-performance liquid chromatography (HPLC) system with a gradient of mobile phase comprising a mixture of water and acetonitrile buffered with an aqueous solution of tetrabutylammonium disulfate at 0.2% by weight, at a pH ranging from 2 to 3, equipped with an ultraviolet (UV) detector functioning at 254 nm. These compounds are identified and quantified by comparing their reaction time and their surface area of chromatographic peaks with those of the standard PPZ derivatives obtained by reaction of a diisocyanate monomer (TDI) of known nature and concentration.

The sample to be analysed may be a polyurethane composition as described previously, before or after stabilization with compound (A).

The sample to be analysed may also be an adhesive composition according to the invention formulated from a polyurethane composition according to the invention.

The compound(s) (A) used according to the invention are other than TDI. Preferably, the compound(s) (A) are also other than the other polyisocyanate(s) optionally used for the synthesis of the 2,4-TDI-based polyurethane bearing NCO end groups according to the invention.

The compound(s) (A) used according to the invention preferably have a molar volume of less than or equal to 250 mL/mol, more preferentially less than or equal to 200 mL/mol.

The molar volume of compound (A) is defined as the ratio of the molar mass, expressed in grams per mole (g/mol) to the mass per unit volume of said compound (measured at a temperature ranging from 20 to 25° C. and at atmospheric pressure of 1 bar), expressed in grams per milliliter (g/mL).

The compound(s) (A) used according to the invention preferably have a molar mass of less than or equal to 300 g/mol.

The compound(s) (A) used according to the invention are preferably chosen from monoisocyanates and diisocyanates.

The compound(s) (A) used according to the invention may be used in the form of a single compound or of a mixture of at least two compounds. Preferably, it is used in the form of a single compound.

The compound(s) (A) used according to the invention may be aromatic or aliphatic, linear or branched, cyclic or acyclic, and saturated or unsaturated.

The compound(s) (A) used according to the invention are advantageously chosen from isocyanate compounds in which the isocyanate group(s) are not linked to a carbon atom of an aromatic hydrocarbon-based ring, for example a six-membered ring, such as a phenyl. These compounds have a reduced toxicological risk when compared with those in which at least one isocyanate group is linked to a carbon atom of an aromatic hydrocarbon-based ring, for example a six-membered ring, such as a phenyl. Specifically, the hydrolysis of the latter aromatic compounds leads to amines that may have toxicological risks to man and his environment.

In particular, the compound(s) (A) used according to the invention are advantageously chosen from isocyanate compounds in which the isocyanate group(s) are not linked to an sp2 hybridized carbon atom.

Among the compounds (A) that may be used according to the invention, it is preferred to use, alone or as a mixture:
aliphatic, acyclic, linear or branched monoisocyanates, for instance:
hexyl isocyanate (molar volume equal to 145.7 mL/mol and molar mass equal to 127.2 g/mol)

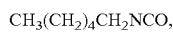

octyl isocyanate (molar volume equal to 176.4 mL/mol and molar mass equal to 155.2 g/mol)

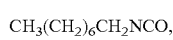

decyl isocyanate (molar volume equal to 208.3 mL/mol and molar mass equal to 183.3 g/mol)

dodecyl isocyanate (molar volume equal to 241 mL/mol and molar mass equal to 211.3 g/mol)

benzyl monoisocyanates, i.e. monoisocyanates comprising in their structure a benzyl group and in which the isocyanate group is linked to the carbon atom of the methyl group substituting the phenyl group, for instance:
benzyl isocyanate (of molar volume equal to 123.5 mL/mol and of molar mass equal to 133.2 g/mol)

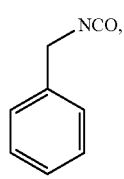

α-methylbenzyl isocyanate (of molar volume equal to 140.8 mL/mol and of molar mass equal to 147.2 g/mol)

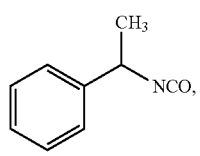

2-methylbenzyl isocyanate, 3-methylbenzyl isocyanate, 4-methylbenzyl isocyanate (of molar volume equal to 139 to 140 mL/mol and of molar mass equal to 147.2 g/mol)

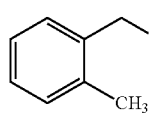 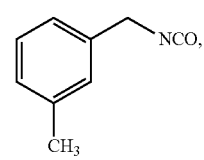

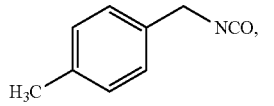

cycloaliphatic monoisocyanates, especially the hydrogenated forms of cyclic aromatic monoisocyanates and in particular the hydrogenated forms of benzyl monoisocyanates, for instance:
the hydrogenated form of benzyl isocyanate or cyclohexanemethyl isocyanate (of molar volume equal to 142.9 mL/mol and of molar mass equal to 139.2 g/mol)

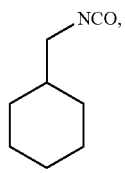

the hydrogenated form of α-methylbenzyl isocyanate (of molar volume equal to 149.9 mL/mol and of molar mass equal to 153.2 g/mol)

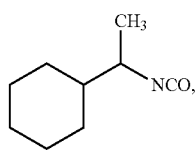

the hydrogenated form of naphthyl isocyanate isomers (HNI), such as hydrogenated 1-naphthyl isocyanate and its isomers (of molar volume equal to 144 mL/mol and of molar mass equal to 179.3 g/mol)

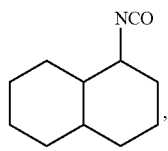

the hydrogenated form of the methylbenzyl isocyanate isomers, such as the hydrogenated forms of 2-methylbenzyl isocyanate, 3-methylbenzyl isocyanate, 4-methylbenzyl isocyanate (of molar volume equal to 149.9 mL/mol and of molar mass equal to 153.3 g/mol)

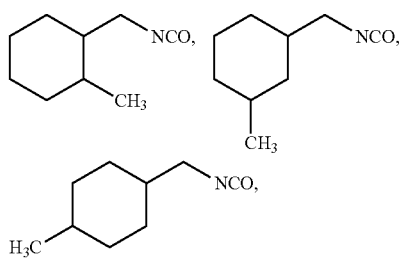

benzyl diisocyanates, i.e. diisocyanates comprising in their structure a benzyl group and in which at least one of the isocyanate groups is linked to the carbon atom of the methyl group substituting a phenyl group, for instance:

the xylene diisocyanate (XDI) isomers, such as meta-xylene diisocyanate (m-XDI) (of molar volume equal to 157 mL/mol and of molar mass equal to 138.2 g/mol)

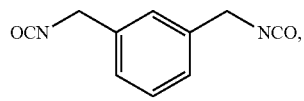

the tetramethylxylene diisocyanate (TMXDI) or bis(1-isocyanato-1-methyl-ethyl)benzene isomers, such as meta-tetramethylxylene diisocyanate (m-TMXDI) (of molar volume equal to 240 mL/mol and of molar mass equal to 244.3 g/mol)

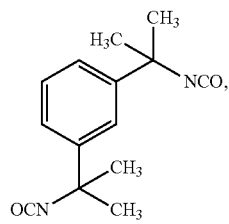

methylenebis(isocyanatomethylphenyl) isomers such as 1,1'-methanediylbis[4-(isocyanatomethyl)benzene] (of molar volume equal to 253.2 mL/mol and of molar mass equal to 278.3 g/mol)

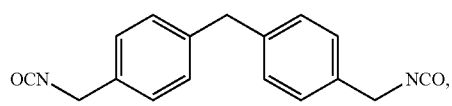

bis(isocyanatomethyl)naphthalene isomers such as 2,6-bis(isocyanatomethyl)-naphthalene (of molar volume equal to 204.9 mL/mol and of molar mass equal to 238.2 g/mol)

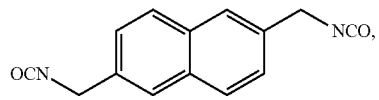

cycloaliphatic diisocyanates, especially the hydrogenated forms of cyclic aromatic diisocyanates and in particular the hydrogenated forms of benzyl diisocyanates, for instance:

the hydrogenated form of the xylene diisocyanate (HXDI) or bis(isocyanatomethyl)cyclohexane isomers, such as hydrogenated meta-xylene diisocyanate (m-HXDI) and its isomers (of molar volume equal to 176 mL/mol and of molar mass equal to 194.2 g/mol)

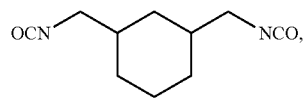

the hydrogenated form of tetramethylxylene diisocyanate (TMXDI) or bis(1-iso-cyanato-1-methylethyl) benzene isomers, such as the hydrogenated form of meta-tetramethylxylene diisocyanate (m-TMXDI) (of molar volume equal to 240.7 mL/mol and of molar mass equal to 250.3 g/mol)

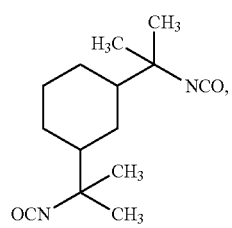

the methylenebis(isocyanatomethylcyclohexyl) isomers such as 1,1'-methanediylbis[4-(isocyanatomethyl)cyclohexane] (of molar volume equal to 253.2 mL/mol and of molar mass equal to 290.4 g/mol)

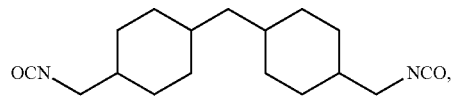

the bis(isocyanatomethyl)decahydronaphthalene isomers such as 2,6-bis-(isocyanatomethyl)decahydronaphthalene (of molar volume equal to 204.9 mL/mol and of molar mass equal to 248.3 g/mol)

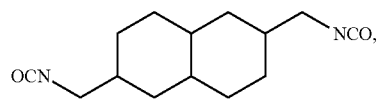

isophorone diisocyanate (IPDI) (of molar volume equal to 246 mL/mol and of molar mass equal to 222.3 g/mol)

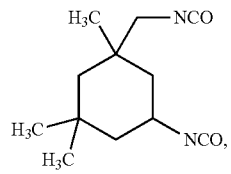

the hydrogenated forms of the toluene diisocyanate (HTDI) isomers, such as the hydrogenated forms of 2,4-TDI and of 2,6-TDI (of molar volume equal to 160.2 mL/mol and of molar mass equal to 180.2 g/mol)

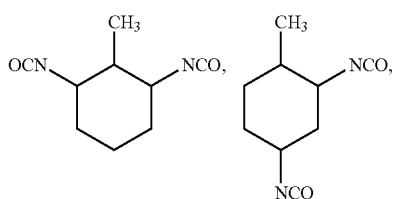

cyclohexylene diisocyanate isomers such as 1,4-cyclohexylene diisocyanate (of molar volume equal to 137.3 mL/mol and of molar mass equal to 166.2 g/mol)

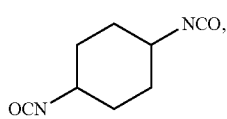

the hydrogenated forms of the naphthalene diisocyanate (HNDI) isomers such as the hydrogenated form of 1,5-HNDI (of molar volume equal to 144 mL/mol and of molar mass equal to 220.3 g/mol)

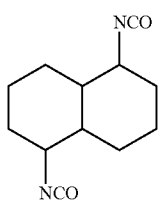

the hydrogenated form of the dimethyldiphenylmethane diisocyanate monomers such as the hydrogenated form of 3,3'-dimethyl-4,4'-diphenyl diisocyanate (molar volume equal to 235 mL/mol and molar mass equal to 276.4 g/mol)

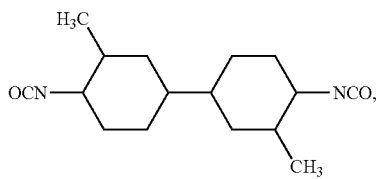

the hydrogenated forms of the diphenylmethane diisocyanate or methylenebis(cyclohexyl isocyanate) (HMDI) isomers such as the hydrogenated form of 4,4'-MDI (of molar volume equal to 212 mL/mol and of molar mass equal to 262.3 g/mol)

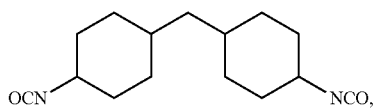

linear or branched acyclic aliphatic diisocyanates, for instance:

1,4-diisocyanatobutane (of molar volume equal to 126.8 mL/mol and of molar mass equal to 140.1 g/mol)

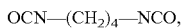

hexamethylene diisocyanate (HDI) or 1,6-diisocyanatohexane (of molar volume equal to 161.7 mL/mol and of molar mass equal to 168.2 g/mol)

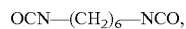

1,8-diisocyanatooctane (of molar volume equal to 194.9 mL/mol and of molar mass equal to 196.3 g/mol)

1,10-diisocyanatodecane (of molar volume equal to 229.8 mL/mol and of molar mass equal to 224.3 g/mol)

1,12-diisocyanatododecane (of molar volume equal to 268.5 mL/mol and of molar mass equal to 252.4 g/mol)

When the compound(s) (A) are chosen from monoisocyanates, it is preferred to use one or more monoisocyanates having a molar volume of less than or equal to 150 milliliters per mole (mL/mol).

Among all the compounds (A) that may be used, it is preferred to use XDI, IPDI, HMDI, or a mixture thereof, and more preferentially XDI.

The total content of compound(s) (A) is non-zero and generally less than 0.5% by weight relative to the total weight of the polyurethane composition according to the invention. Preferably, it is less than or equal to 0.3% by weight relative to the total weight of the polyurethane composition according to the invention. Advantageously, it is less than 0.1% by weight relative to the total weight of the polyurethane composition according to the invention.

The total content of compound(s) (A) is also preferably greater than or equal to 0.01% by weight and more preferentially greater than or equal to 0.05% by weight relative to the total weight of the polyurethane composition according to the invention. Better still, the content of compound(s) (A) ranges from 0.05% to 0.3% by weight relative to the total weight of the polyurethane composition according to the invention.

The polyurethane composition according to the invention as described above may be used as such as an adhesive composition or may be used for manufacturing a one-pack or two-pack adhesive composition.

Thus, a subject of the present patent application is, secondly, an adhesive composition comprising at least 50% by weight of a polyurethane composition according to the invention.

The adhesive compositions according to the invention have the advantage of being stable in terms of viscosity over long periods of storage and as a result are easy to use.

In particular, the addition of the compound(s) (A) does not disrupt the mechanical, adhesive and/or applicative properties of the adhesive composition. Advantageously, these properties are not substantially degraded after storage.

The adhesive composition according to the invention may be manufactured from the polyurethane composition according to the invention by simple addition and mixing of one or more ingredients usually used in the preparation of an adhesive composition.

Among these ingredients, examples that may be mentioned include crosslinking catalysts, fillers, plasticizers, rheology agents, tackifying resins, adhesion promoters, UV stabilizers (or antioxidants), pigments, colorants, and mixtures of these ingredients.

Thus, the adhesive composition according to the invention may comprise at least one crosslinking catalyst.

As crosslinking catalyst(s) that may be used in the adhesive composition according to the invention, mention may be made of any catalyst(s) known to those skilled in the art for catalysing the crosslinking of polyurethane bearing NCO end groups in the presence of water (or moisture). The water or moisture may be provided by the surface of the support or the surrounding medium, in a natural manner (atmospheric moisture) or a controlled manner (for example in a thermostatic chamber at a relative humidity of between 40% and 70% at 23° C., or an oven ranging up to 150° C.) on contact with the composition according to the invention. This crosslinking is reflected by the creation, between the polymer chains of the polyurethane, of bonds of urea type which lead to the formation of a three-dimensional polymer network.

The amount of crosslinking catalyst(s) that may be used is preferably less than or equal to 1% by weight relative to the weight of the adhesive composition. It may especially range from 0.01% to 1% by weight and more preferentially from 0.05% to 0.5% by weight relative to the weight of the adhesive composition.

The adhesive composition according to the invention may comprise at least one filler.

The filler(s) that may be used in the adhesive composition according to the invention may be chosen from mineral fillers and organic fillers. These fillers are in the form of particles of diverse geometry. They may be, for example, spherical, fibrous, or have an irregular shape.

As examples of mineral fillers that may be used, use may be made of any mineral filler(s) usually used in the field of adhesive compositions.

Use may be made, for example, of clay, quartz, carbonated fillers such as alkali metal or alkaline-earth metal carbonates, and more particularly calcium carbonate. These fillers may be natural or treated, for example with an organic acid such as stearic acid or a mixture of organic acids consisting predominantly of stearic acid.

Use may also be made of hollow mineral microspheres such as hollow glass microspheres, and more particularly those made of sodium calcium borosilicate or of aluminosilicate.

As examples of organic filler(s) that may be used, use may be made of any organic filler(s) and especially polymeric fillers usually used in the field of adhesive compositions.

Use may be made, for example, of polyvinyl chloride (PVC), polyolefins, rubber, ethylene vinyl acetate (EVA), or aramid fibres such as Kevlar®.

Use may also be made of hollow microspheres made of expandable or non-expandable thermoplastic polymer. Mention may be made especially of hollow microspheres of vinylidene chloride/acrylonitrile.

The mean particle size of the filler(s) that may be used is preferably less than or equal to 10 microns, more preferentially less than or equal to 3 microns, so as to avoid their sedimentation in the adhesive composition according to the invention during its storage.

The mean particle size is measured for a volume particle size distribution and corresponding to 50% by volume of the sample of particles analysed. When the particles are spherical, the mean particle size corresponds to the median diameter (D50 or Dv50) which corresponds to the diameter such that 50% of the particles by volume have a size smaller than said diameter. In the present patent application, this value is expressed in micrometers and determined according to standard NF ISO 13320-1 (1999) by laser scattering on a Malvern machine.

The total amount of filler(s) that may be used is preferably less than or equal to 20% by weight relative to the weight of the adhesive composition. It may especially range from 1% to 20% by weight relative to the weight of the adhesive composition.

The adhesive composition according to the invention may comprise at least one plasticizer.

As examples of plasticizers that may be used, use may be made of any plasticizer usually used in the field of adhesive compositions.

Use may be made, for example, of:
diisodecyl phthalate (DIDP),
an ester of an alkylsulfonic acid and of phenol, as sold under the name Mesamoll® by the company Lanxess,
diisononyl 1,2-cyclohexanedicarboxylate, as sold under the name Hexamoll Dinch® by the company BASF.

The total amount of plasticizer(s) that may be used is preferably less than or equal to 20% by weight relative to the weight of the adhesive composition. It may especially range from 1% to 20% by weight relative to the weight of the adhesive composition.

The adhesive composition according to the invention may comprise at least one rheology agent.

As examples of rheology agents that may be used, mention may be made of any rheology agent usually used in the field of adhesive compositions.

Preferably, use is made of one or more rheology agents chosen from thixotropic agents, for instance fumed silica or urea derivatives derived from the reaction of an aromatic diisocyanate monomer such as 4,4'-MDI with an aliphatic amine such as butylamine. The preparation of such urea derivatives is especially described in patent application FR 1 591 172.

The total amount of rheology agent(s) that may be used is preferably less than or equal to 10% by weight relative to the weight of the adhesive composition. It may especially range from 1% to 10% by weight relative to the weight of the adhesive composition.

The adhesive composition according to the invention may comprise at least one tackifying resin.

As examples of tackifying resin(s) that may be used, mention may be made of any tackifying resin usually used in the field of adhesive compositions.

Preferably, use is made of those with a weight-average molar mass ($M_w$) ranging from 200 to 5000 and preferably chosen from:
(i) rosins of natural or chemically modified origin, for instance rosin treated with pine gum, wood rosin extracted from tree roots and hydrogenated, dimerized, polymerized derivatives thereof or derivatives esterified with monoalcohols or polyols such as glycerol, pentaerythritol or neopentyl glycol;
(ii) resins obtained by hydrogenation, polymerization or copolymerization (with an aromatic hydrocarbon) of mixtures of unsaturated aliphatic hydrocarbons containing approximately 5, 9 or 10 carbon atoms derived from petroleum fractions;
(iii) terpene resins generally resulting from the polymerization of terpene hydrocarbons, for instance monoterpenes (or pinene) in the presence of Friedel-Crafts catalysts, optionally modified by the action of phenols;
(iv) polymers based on natural terpenes, for example styrene/terpene, α-methyl styrene/terpene and vinyltoluene/terpene.

The tackifying resin is chosen so as to be compatible with the polyurethane bearing NCO end groups used according to the invention, i.e. so that when it is mixed in proportions of 50% by weight/50% by weight with said polyurethane bearing NCO end groups, this gives a substantially homogeneous mixture. In particular, the mixture remains transparent (in the visible light spectrum—wavelength ranging from 380 to 780 nanometers, measured in a vacuum) and no phase separation or total or partial gelation is observed in the polyurethane/resin mixture.

The total amount of tackifying resin(s) that may be used is preferably less than or equal to 50% by weight relative to the weight of the adhesive composition. It may especially range from 1% to 50% by weight and preferably from 39% to 50% by weight relative to the weight of the adhesive composition.

Preferably, the adhesive composition does not comprise any organic solvent with a boiling point of less than 250° C. at atmospheric pressure, such as ethyl acetate, xylene, toluene or N-methyl-2-pyrrolidone (NMP).

The adhesive composition according to the invention may comprise at least one adjuvant chosen from adhesion promoters such as epoxysilanes, UV stabilizers (or antioxidants), pigments, colorants, and a mixture thereof. When these adjuvants are present in the composition, the total sum of their content is preferably less than or equal to 10% by weight relative to the total weight of the adhesive composition.

The adhesive composition according to the invention may thus comprise:
- at least 50% by weight of a polyurethane composition according to the invention,
- from 0 to 1% by weight, preferably from 0.01% to 1% by weight, of at least one crosslinking catalyst,
- from 0 to 20% by weight of at least one filler,
- from 0 to 20% by weight of at least one plasticizer,
- from 0 to 10% by weight of at least one rheology agent,
- from 0 to 50% by weight of at least one tackifying resin,
- from 0 to 10% by weight of at least one adjuvant chosen from adhesion promoters, UV stabilizers (or antioxidants), pigments, colorants, and a mixture thereof, said weight percentages being expressed relative to the total weight of the adhesive composition.

The adhesive compositions according to the invention are formulated so as to be able to be used or applied at low temperature (between 5 and 35° C.) and especially at room temperature (23° C.).

A subject of the present invention is, thirdly, a process for preparing a composition according to the invention which is stable over time in terms of viscosity, comprising a step in which the compound(s) (A) and the other ingredient(s) optionally present in the composition according to the invention are mixed with a 2,4-TDI-based non-hot-melt polyurethane composition bearing NCO end groups having a content of TDI of less than 0.1% by weight relative to the weight of said composition, at a temperature of less than or equal to 95° C., preferably at a temperature of less than or equal to 85° C. and better still less than or equal to 80° C.

The addition and mixing are performed under anhydrous compositions.

The compound(s) (A) used according to the invention may be added to the 2,4-TDI-based hot-melt polyurethane(s) bearing NCO end groups, in the composition according to the invention, either directly after the end of the reaction for the synthesis of said polyurethane(s), or after one, several or all of the other optional ingredients of the composition according to the invention, as described previously, have been mixed with said polyurethane(s).

When the addition of the compound(s) (A) is performed directly after the end of the reaction for the synthesis of said polyurethane(s), this addition is preferably performed while hot for better homogeneity of the mixture, at a temperature varying within the temperature ranges for the synthesis of said polyurethane(s) described above. In particular, the addition of the compound(s) (A) may take place, for example, at a temperature ranging from 65 to 85° C.

When the addition of the compound(s) (A) takes place subsequently, after addition of one or more optional ingredients of the composition according to the invention, as described previously, this addition may be performed while hot, with the proviso that the optional ingredients(s) added previously are not thermally degraded, or at a lower temperature to avoid such a thermal degradation. In particular, the addition of the compound(s) (A) may take place, for example, at room temperature.

The example that follows is given purely as an illustration of the invention and cannot be interpreted as limiting the scope thereof.

EXAMPLES

The polyurethane compositions of Examples 1 and 2 were prepared by mixing the ingredients indicated in Table 1 according to the experimental protocol described below.

The amounts indicated in Table 1 are expressed in grams.

TABLE 1

| Ingredients | 1 | 2 |
|---|---|---|
| PPG triol (M = 3400 g/mol) | 88.7 | 88.7 |
| TDI containing 99% by weight of 2,4-TDI (% NCO = 48.1% by weight) | 11.3 | 11.3 |
| XDI (% NCO = 44.7% by weight) | — | 0.3 |
| NCO/OH ratio, r1 | 1.7 | 1.7 |

Preparation of the Polyurethane Composition of Example 1

The polyol and the diisocyanate are successively added to a reactor placed under a nitrogen atmosphere. This mixture is maintained under constant stirring at 78° C., under nitrogen, until the reaction of the NCO functions of the diisocyanate is complete.

The reaction is monitored by measuring the change in the content of NCO groups in the mixture, for example by a dibutylamine back-titration using hydrochloric acid, according to standard NF T52-132.

After 3 hours, the synthesis reaction is complete. The mixture is stirred at the same temperature for a further 2 hours and then allowed to cool to room temperature. The polyurethane composition obtained is then transferred for storage and characterization, as described below.

Preparation of the Polyurethane Composition of Example 2

The polyol and the diisocyanate are successively added to a reactor placed under a nitrogen atmosphere. This mixture is maintained under constant stirring at 78° C., under nitrogen, until the reaction of the NCO functions of the diisocyanate is complete.

The reaction is monitored by measuring the change in the content of NCO groups in the mixture, for example by a dibutylamine back-titration using hydrochloric acid, according to standard NF T52-132.

After 3 hours, the synthesis reaction is complete. XDI is added to the mixture. The mixture is stirred for a further 2 hours at 78° C. and then allowed to cool to room temperature. The polyurethane composition obtained is then transferred for storage and characterization, as described below.

Characterization:

For each of the polyurethane compositions of Examples 1 and 2 obtained:

The viscosity of the polyurethane composition is measured, respectively, at the end of reaction (D+0), 7 days after the end of the reaction (D+7), and then 28 days after the end of the reaction (D+28), and then 56 days after the end of the reaction (D+56), and then 113 days after the end of the reaction (D+113) at 23° C. under anhydrous storage conditions.

The viscosity measurement is performed at 23° C. using a Brookfield RVT viscometer, with a No. 6 needle at a spin speed of 20 revolutions per minute (rpm). The value measured is expressed in millipascal-seconds (mPa·s).

The weight content of unreacted diisocyanate monomer present in the polyurethane synthesis medium is measured via an HPLC method equipped with a UV detector as described previously (C18 reverse phase, mobile phase: aqueous solution of acetonitrile, buffered with an aqueous solution containing 0.2% by weight of tetrabutylammonium bisulfate at a pH equal to 2.5, detection wavelength: 254 nm). The values measured are expressed as weight percentages relative to the weight of the composition of each of the Examples 1 and 2.

The results of these measurements are collated in Table 2.

TABLE 2

| Characterization | 1 | 2 |
|---|---|---|
| Residual TDI content measured (in % by weight relative to the weight of the polyurethane composition) | <0.1 | <0.1 |
| Viscosity at 23° C. (mPa · s) (D + 0) | 10 420 | 10 800 |
| Viscosity at 23° C. (mPa · s) (D + 7) | 18 800 | 15 140 |
| Viscosity at 23° C. (mPa · s) (D + 28) | 64 500 | 20 650 |
| Viscosity at 23° C. (mPa · s) (D + 56) | 197 000 | 31 350 |
| Viscosity at 23° C. (mPa · s) (D + 113) | 430 000 | 46 000 |

It is observed that after 28 days of storage under identical conditions, the composition of Example 2 according to the invention shows a significant reduction in viscosity relative to the viscosity measured on the non-stabilized polyurethane composition of Example 1. In addition, the increase in viscosity of the composition of Example 2 is less than that of the composition of Example 1, as shown by FIG. 1.

Moreover, comparison of the polyurethane compositions of Examples 1 and 2 under the same test conditions showed that the mechanical, adhesive and/or applicative properties of the polyurethane composition of Example 1 were not degraded by the addition of XDI. The performance qualities of the composition of Example 2 are thus at least equal to those of the composition of Example 1.

BRIEF DESCRIPTION OF THE DRAWING

FIG. 1—Shows the increase in viscosity of the composition of Example 2 is less than that of the composition of Example 1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French Application No. FR 14/54823, filed May 28, 2014 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A polyurethane composition comprising:
   a) at least 98% by weight of at least one polyurethane bearing NCO end groups based on 2,4-toluene diisocyanate (2,4-TDI), which is not solid at a temperature ranging from 5 to 35° C.,
   b) a TDI monomer content of less than 0.1% by weight,
   c) at least one isocyanate compound with a molar volume of less than or equal to 300 milliliters per mole (mL/mol) (noted compound A), in which the isocyanate group(s) are not linked to a carbon atom of an aromatic hydrocarbon-based ring,
the weight percentages being expressed relative to the total weight of said composition.

2. The composition according to claim 1, wherein the compound(s) (A) are monoisocyanates or diisocyanates.

3. The composition according to claim 1, compound (A) is XDI.

4. The composition according to claim 1, comprising a total content of compound(s) (A) which is non-zero and less than 0.5% by weight relative to the weight of said composition.

5. The composition according to claim 1, wherein the non-hot-melt polyurethane(s) bearing NCO end groups based on 2,4-TDI may be obtained via a polyaddition reaction of a polyisocyanate composition consisting of TDI at 95% by weight at least of 2,4-TDI relative to the weight of TDI, and of a composition comprising polyol(s), at a temperature of less than 95° C., under anhydrous conditions, in amounts of polyisocyanate(s) and of polyol(s) leading to an NCO/OH ratio noted r1 ranging from 1.60 to 1.90.

6. The composition according to claim 5, wherein the temperature ranges from 70 to 80° C. and the NCO/OH ratio noted r1 ranges from 1.65 to 1.80.

7. The composition according to claim 5, wherein the composition comprising polyol(s) comprises at least one polyether polyol.

8. An adhesive composition, comprising:
   at least 50% by weight of a polyurethane composition as defined in claim 1,
   from 0 to 1% by weight of at least one crosslinking catalyst,
   from 0 to 20% by weight of at least one filler,
   from 0 to 20% by weight of at least one plasticizer,
   from 0 to 10% by weight of at least one rheology agent, from 0 to 50% by weight of at least one tackifying resin,
from 0 to 10% by weight of at least one adjuvant comprising adhesion promoters, UV stabilizers (or antioxidants), pigments, colorants, or a mixture thereof, said weight percentages being expressed relative to the total weight of the adhesive composition.

9. A process for preparing a composition as defined in claim 1, comprising a step in which the compound(s) (A), and the other ingredient(s) optionally present in said composition, are mixed with a polyurethane composition comprising at least one polyurethane bearing NCO end groups based on 2,4-TDI, which is not solid at a temperature ranging from 5 to 35° C., and a TDI content of less than 0.1% by weight relative to the weight of said composition, at a temperature of less than or equal to 95° C., under anhydrous conditions in post-synthesis of said 2,4-TDI-based polyurethane bearing NCO end groups.

10. The process according to claim 9 for preparing a composition, wherein the compound(s) (A) are mixed with said composition:

either directly after the end of the reaction for the synthesis of the polyurethane bearing NCO end groups based on 2,4-TDI, or after one, several or all of the other ingredients of the composition have been mixed with the polyurethane bearing NCO end groups based on 2,4-TDI.

11. A method for stabilizing the viscosity of a composition comprising at least 98% by weight of at least one polyurethane based on 2,4-TDI bearing NCO end groups, which is not solid at a temperature ranging from 5 to 35° C., and a TDI content of less than 0.1% by weight relative to the weight of said composition, comprising adding to said composition at least one isocyanate compound with a molar volume of less than or equal to 300 milliliters per mole other than TDI, which isocyanate compound does not have isocyanate groups linked to a carbon atom of an aromatic hydrocarbon ring.

* * * * *